United States Patent [19]

Otani et al.

[11] Patent Number: 5,017,683
[45] Date of Patent: May 21, 1991

[54] CONDENSED POLYCYCLIC, POLYNUCLEAR AROMATIC THERMOSETTING RESIN HAVING GOOD MOLDABILITY AND HEAT RESISTANCE; AND PREPARATION THEREOF

[75] Inventors: Sugio Otani, Kiryu; Michio Tsuyuguchi, Urawa; Haruyuki Kano; Yoshihisa Sone, both of Ibaragi; Kenji Kageyama, Tokyo; Toshiaki Mabuchi, Chofu, all of Japan

[73] Assignee: Sumikin Chemical Co., Ltd., Tokyo, Japan

[21] Appl. No.: 398,485

[22] Filed: Aug. 25, 1989

[30] Foreign Application Priority Data

Feb. 23, 1989 [JP] Japan ................................. 1-43630

[51] Int. Cl.⁵ .................. C08G 59/00; C08G 61/00
[52] U.S. Cl. ................................. 528/396; 528/86
[58] Field of Search ............................. 528/86, 396

[56] References Cited

U.S. PATENT DOCUMENTS 4,017,434 4/1977 Suzui et al. ..................... 525/225
4,177,221 12/1979 Schamberg et al. ............. 525/244
4,197,353 4/1980 Tobias et al. ..................... 428/458

Primary Examiner—Morton Foelak
Assistant Examiner—T. Mosley
Attorney, Agent, or Firm—Burns, Doane, Swecker & Mathis

[57] ABSTRACT

A condensed polycyclic, polynuclear aromatic thermosetting resin with improved moldability which is prevented from forming a cloud on a mold during molding is disclosed. The resin is a prepolymer derived by condensation polymerization of a condensed polycyclic aromatic compound or a mixture thereof with a monocyclic aromatic compounds and an aromatic compound having at least two hydroxymethyl groups as a crosslinking agent in the presence of an acid catalyst. The resin has a flow temperature of not higher than 150° C. The acid catalyst is water-insoluble or when it is water-soluble the resin has an insolubilized acid ratio of at least 50%. The resin is useful in the manufacture of thermoset molded articles having good heat resistance and good mechanical and electrical properties. It can be blended with a filler and/or reinforcing agent to form a molding compound.

11 Claims, No Drawings

CONDENSED POLYCYCLIC, POLYNUCLEAR AROMATIC THERMOSETTING RESIN HAVING GOOD MOLDABILITY AND HEAT RESISTANCE; AND PREPARATION THEREOF

BACKGROUND OF THE INVENTION

1. Field of the Invention

This invention relates to a condensed polycyclic, polynuclear aromatic thermosetting resin having good moldability and heat resistance which are particularly improved with respect to the formation of a cloud on a mold during molding, thereby making it possible to produce molded articles with significantly improved surface gloss. This invention also concerns a method for the preparation of the aromatic thermosetting resin and a molding compound comprising the resin.

2. Description of the Prior Art

Thermosetting resins such as phenolic resins, urea-formaldehyde resins, melamine-formaldehyde resins, epoxy resins, unsaturated polyester resins, and polyimide resins find a wide variety of applications on account of having heat resistance which is superior to that of thermoplastic resins. However, except for polyimides, the long-term service temperature of these resins is on the order of 150° C. to at most 200° C.

Polyimide resins have extremely good heat resistance and their long-term service temperature is between 200° C. and 300° C. However, they are expensive and have a drawback of relatively poor moldability.

Recently one of the inventors found a novel class of thermosetting resins which are condensed polycyclic, polynuclear aromatic hydrocarbon resins having good heat resistance. These novel resins are prepared by reacting a condensed polycyclic aromatic compound or a mixture comprising it in a major amount with a crosslinking agent which is an aromatic compound having at least two hydroxymethyl or halomethyl groups at an elevated temperature in the presence of an acid catalyst. These resins, which are called COPNA resins for short are disclosed in Japanese Patent Applications Kokai Nos. 62-521 and 62-522 (1987).

In general, aromatic hydrocarbon resins including the above-mentioned condensed polycyclic polynuclear aromatic hydrocarbon resins are advantageous in that they have good heat resistance and can be easily modified because they can be readily subjected to co-condensation with aromatic compounds having a variety of functional groups. Thus, it is possible to endow these resins with a wide variety of properties or with a special function. For this reason, the COPNA resins are considered to hold great promise.

In addition to good heat resistance, thermoset moldings of the aromatic hydrocarbon resins (COPNA resins) have good electrical insulating properties and good resistance to humidity and chemicals. Therefore, they are likely to find applications in many fields for single uses or for use as a matrix resin to form a composite.

However, the COPNA resins have the drawback that when they are shaped and cured in a mold, a considerable amount of pale green deposits is formed on the inner surface of the mold. The formation of such deposits is called "clouding" since the deposits resemble a cloud, and it significantly deteriorates the surface gloss of the resulting molding. If a clouded mold is used repeatedly in continuous molding, mold release gradually becomes difficult. In some cases, molding may become impossible with the mold after it has been used several times. Therefore, it is necessary or desirable to clean the mold frequently or in some cases after each cycle of molding, but this cleaning is burdensome and greatly decreases the productivity of moldings. Thus, although the COPNA resins have good heat resistance and other desirable physical, electrical, and chemical properties, they suffer from the serious problem of poor moldability caused by cloud-formation on the mold.

SUMMARY OF THE INVENTION

It is an object of this invention to provide a novel aromatic thermosetting resin having improved moldability which is effectively prevented from forming a cloud on a mold during molding so that it can be used in continuous molding for an extended period of time.

It is another object of the invention to provide an aromatic thermosetting resin from which thermoset moldings having smooth and glossy surfaces can be formed.

A further object of the invention is to provide a method for the preparation of such an aromatic thermosetting resin.

A still further object of the invention is to provide a molding compound, particularly useful for the manufacture of slide parts.

In one aspect, this invention provides a condensed polycyclic, polynuclear aromatic thermosetting resin which is prevented from forming a cloud on a mold during molding. The resin is a prepolymer derived by condensation reaction of a starting material with a crosslinking agent in the presence of an acid catalyst. The starting material is selected from the group consisting of condensed polycyclic aromatic compounds and mixtures of a condensed polycyclic aromatic compound with a monocyclic aromatic compound. The crosslinking agent is an aromatic compound having at least two hydroxymethyl groups. The resin has a flow temperature of not higher than 150° C. The acid catalyst may be either water-insoluble or water-soluble. When the acid catalyst is water-soluble, the resin should have an insolubilized acid ratio of at least 50%.

The flow temperature and insolubilized acid ratio of the prepolymer may be determined by the methods described below.

In another aspect, this invention provides an improved method for preparing a condensed polycyclic, polynuclear aromatic thermosetting resin which is prevented from forming a cloud on a mold during molding. The method comprises reacting a starting material selected from the group consisting of condensed polycyclic aromatic compounds and mixtures of a condensed polycyclic aromatic compound and a monocyclic aromatic compound with a crossinking agent which is an aromatic compound having at least two hydroxymethyl groups in the presence of an acid catalyst. The acid catalyst is a water-soluble acid which is reactive with either one of the starting material or the crosslinking agent or both. The resulting thermosetting resin has an insolubilized acid ratio of at least 50% and a flow temperature of not higher than 150° C. Alternatively, the acid catalyst is a water-insoluble acid and the resulting thermosetting resin has a flow temperature of not higher than 150° C.

DETAILED DESCRIPTION OF THE INVENTION

In order to investigate the mechanism of the formation of a cloud on a mold during molding of the prior art aromatic thermosetting hydrocarbon resins called COPNA resins, the present inventors performed numerous molding experiments using these resins and chrome-plated molds and analyzed samples taken from the deposits in the clouded portions of the mold and the chrome-plating of the clouded portions by various analytical means including fluorescent X-ray spectrometry, IR spectrometry, gel permeation chromatography, and secondary ion mass spectrometry to study the effects on clouding of the starting material, crosslinking agent, acid catalyst, water, etc.

As a result, it was found that during curing of the aromatic resins an exudate is formed which is derived from the acid catalyst remaining in the molding material and the water of condensation formed in the mold. It is believed that the mechanism of mold clouding is that the acid catalyst is dissolved in the water of condensation which is formed during curing thereby forming an acid solution. The acid solution thus formed exudes out on the surface of the molding and reacts with the metals constituting the mold to form metallic salts, which are deposited on the surface of the mold and become visible as a cloud.

It has been found that mold clouding can be prevented when the acid catalyst is not dissolved in the water of condensation formed during curing. The dissolution of an acid catalyst in the water of condensation can be effectively prevented, when the catalyst is a water-soluble acid, by using an organic sulfonic acid which is reactive with hydroxymethyl groups of the crosinking agent or an organic sulfonic acid having one or more functional groups such as hydroxymethyl and formyl groups which are reactive with the aromatic condensed polycyclic compound used as the starting material, and reacting the acid catalyst with either the crosslinking agent or the starting material to substantially fix it in the skeleton of the resulting thermosetting prepolymer. Alternatively, the dissolution of an acid catalyst may be prevented by using a water-insoluble acid catalyst such as a high-molecular weight sulfonic acid resin or a hydrophobic sulfonic acid compound.

The condensed polycyclic, polynuclear aromatic thermosetting hydrocarbon resin according to the present invention does not cause significant exudation of the acid catalyst remaining in the resin unless the acid catalyst is used in an extremely large amount.

The condensed polycyclic aromatic compounds useful as the starting material in the present invention include naphthalene, acenaphthene, phenanthrene, anthracene, pyrene, chrysene, naphthacene, fluoranthene, perylene, picene, benzopyrenes, and benzoperylenes as well as alkyl-substituted or hydroxy-substituted derivatives of these compounds such as methylnaphthalenes and naphthols. One or more of these compounds may be used.

The monocyclic aromatic compounds which may be used as the starting material include alkylbenzenes and phenols such as phenol, alkylphenols, resorcinol, and naphthols. One or more of these monocyclic compounds may be used in combination with the above-mentioned condensed polycyclic compounds to modify the properties of the resulting resin.

Also included in the useful monocyclic or polycyclic starting materials are polynuclear compounds having two or more aromatic monocyclic or polycyclic rings attached through a singe bond or a linking group such as oxy (—O—) or a hydrocarbyl linking group such as methylene, phenylene, or xylylene group. Examples of these polynuclear compounds are biphenyl, diphenyl ether, binaphthyl, and benzylnaphthalenes.

Furthermore, heavy oils and pitches which are derived from coal tar or petroleum and which are comprised predominantly of the above mentioned aromatic compounds may be used as the starting material.

It is preferable to use at east one condensed polycyclic compound which contains one or more naphthalene rings as the starting material. Particularly preferred starting materials are naphthalene, naphthols, and a mixture of naphthalene and phenol.

When a monocyclic aromatic compound such as phenol is used in combination with the polycyclic compound, a curing agent may be added when the resulting resin is cured. Suitable curing agents include hexamethylenetetramine, phenolic resins, fatty acids, and epoxy resins.

The aromatic compound having at least two hydroxymethyl groups which is used as a crosinking agent in the present invention includes poly(hydroxymethyl) derivatives of aromatic hydrocarbons such as benzene, naphthalene, anthracene, pyrene and their alkyl derivatives such as toluene and xylene. Preferred crosinking agents are dihydroxymethylbenzene, dihydroxy-methylxylene, trihydroxymethylbenzene, and dihydroxymethylnaphthalene.

The acid catalyst used in the present invention may be either water-soluble or water-insoluble. If a water-soluble acid catalyst is used, however, it is important that the acid catalyst be reactive with either the starting material or the crosslinking agent used in the reaction. Thus, useful water-soluble acid catalysts include organic sulfonic acids which are reactive with the hydroxymethyl groups of the crosinking agent as well as organic sulfonic acids having at least one functional group selected from hydroxymethyl and formyl groups which are reactive with the starting material.

Examples of the acid catalysts which are reactive with the hydroxymethyl groups of the crosslinking agent include organic sulfonic acids having a polycyclic or phenolic structure, and organic sulfonic acids having at least one reactive functional group such as carboxyl, amino, epoxy, or unsaturated hydrocarbyl group. Of these, polycyclic or phenolic sulfonic acids, e.g., naphthalenesulfonic acids, akylnaphthalenesulfonic acids, acenaphthenesulfonic acids, anthracenesulfonic acids, phenolsulfonic acids, and naphtholsulfonic acids are preferred.

Examples of the organic sulfonic acids having at least one functional group selected from hydroxymethyl and formyl groups which are reactive with the starting material include hydroxymethylbenzenesulfonic acid, hydroxymethylnaphtalenesulfonic acid, dihydroxymethyl-naphthalenesulfonic acid, formylbenzenesulfonic acid, and formylnaphthalene sulfonic acid.

Useful water-insoluble acid catalysts include sulfonic acid-containing resins such as polystyrene-sulfonic acid resins prepared by crosslinking a styrene polymer with divinylbenzene followed by sulfonation; phenol-sulfonic acid resins prepared by a condensation reaction of an aromatic sulfonic acid such as a phenolsulfonic acid or a naphthalenesulfonic acid with a crosslinking agent such as an aldehyde, e.g., formaldehyde, or an aromatic compound having at least two hydroxymethyl groups; and sulfonated products of condensed polycyclic polynuclear aromatic resins (COPNA resins). The sulfonated products of COPNA resins may be readily obtained by sulfonating a COPNA resin with concentrated sulfuric acid followed by washing with water or other treatment to remove the water-soluble acid remaining in the sulfonated resin.

Another type of water-insoluble sulfonic acid is those having one or more hydrophobic groups such as higher aliphatic hydrocarbyl groups. Examples of these compounds are dinonylnaphthalenesulfonic acid and didodecylnaphthalenesulfonic acid. They are also useful as the acid catalyst in the present invention.

The amount of the acid catalyst used depends on the reactivity of the starting material, the reaction temperature, and the reaction technique. The acid catalyst is generally used in an amount of at least about 0.2%, preferably from about 1% to about 20%, and more preferably not more than 10% by weight based on the total weight of the starting material and the crosslinking agent. When the acid catalyst is used in an amount of less than 0.2% by weight, the condensation reaction will not proceed sufficiently and the resulting resin will not exhibit satisfactory thermosetting properties. When the amount of the catalyst is more than 20% by weight, the reaction rate will be accelerated excessively, thereby not only making it difficult to control the reaction but resulting in the formation of a non-uniform resin.

The molar ratio of the crossinking agent to the starting material used in the reaction is preferably within the range of from about 0.7 to about 6, and more preferably within the range of from about 1 to about 3. At a molar ratio of less than 0.7 the resulting resin will not exhibit thermosetting properties, while at a molar ratio of more than 6, the amount of the crosslinking agent is excessively large and the reaction tends to be restrained and to form a relatively non-uniform product.

The reactants (starting material and crosslinking agent) and acid catalyst are mixed in predetermined proportions and reacted at an elevated temperature. The reaction temperature is generally from about 50° C. to about 200° C. and preferably from about 80° C. to about 180° C. The reaction is usually carried out at atmospheric pressure or under slight pressure. However, a subatmospheric pressure may also be employed in order to facilitate removal from the reaction system of the water of condensation formed as a by-product in the reaction, thereby accelerating the reaction.

The reaction can be conveniently performed in a molten state in the absence of a solvent or dispersion medium. Alternatively, it may be carried out in solution or dispersion using an appropriate solvent or dispersion medium.

In the case of melt polymerization, as the polycondensation reaction proceeds, the viscosity of the reaction mixture increases, resulting in the formation of the desired thermosetting resin which is a prepolymer called a B-stage resin. If the reaction further proceeds with heating, the prepolymer will be converted to an insoluble, infusible thermoset or Cured mass. Therefore, in order to obtain a moldable thermosetting resin, heating should be stopped to terminate the reaction before the final thermoset mass is formed. The desired product is a thermosetting resin having a flow temperature of 150° C. or lower. It is a prepolymer at the B-stage and still retains fusibility upon heating and solubility in a solvent. Likewise, when the reaction is performed in solution or dispersion, the reaction should be terminated at the same stage as above so that a prepolymer having a flow temperature of 150° C. or lower is obtained.

According to the present invention, if the acid catalyst, usually of the sulfonic acid type, is water-soluble, it has a reactivity with at east either the starting material or the crosslinking agent so that a major proportion of the acid catalyst is reacted during the polycondensation reaction to fix it in the skeleton of the resulting prepolymer. Thus, the acid present in the resin product no longer exhibits substantial solubility in water.

The resin product in the form of a prepolymer should have an insolubilized acid ratio of at least 50%. The term insolubilized acid ratio used herein is the percentage of the insolubilized acid (water-insoluble acid) present in the resin relative to the total acid present in the resin. It is determined by the acid content of the resin after the water-soluble acid in the resin is removed by extraction with water divided by the acid content thereof before the extraction. The measurement of the acid content of the resin may be carried out by dissolving the resin substantially completely in a water-miscible organic solvent in which the prepolymer is soluble and determining the acid content of the resulting resin solution, for example, by titration with an aqueous alkali solution.

In order to ensure that the prepolymer has an insolubilized acid ratio of at least 50%, it is preferred to select the reactants and the acid catalyst in view of their respective reactivities. By way of example, when the acid catalyst used is reactive with the crosslinking agent, it is preferred that the reactivity between the acid catalyst and the crosslinking agent be at the same level as that between the starting material and the crossinking agent. For example, if naphthalene is used as the starting material, naphthalenesulfonic acid may preferably be used as the acid catalyst.

On the other hand, when a water-insoluble acid catalyst such as a sulfonic acid polymer resin or a hydrophobic sulfonic acid is used, it is not necessary to take the insolubilized acid ratio of the resulting resin into consideration, since the catalyst is insoluble in water.

The prepolymer can be collected in a conventional manner. When a water-soluble catalyst is used, the unreacted acid catalyst remaining in the resin can be removed partly by washing the product with a suitable solvent such as water. If the reaction is performed in a solvent, a portion of the unreacted water-soluble acid catalyst will be removed with the solvent during separation of the product from the solvent.

The thermosetting prepolymer product according to the present invention which has a flow temperature of 150° C. or lower can be readily converted to a thermoset product by heating it at a temperature from about 100° C. to about 350° C. A thermoset shaped article may be obtained, for example, by pressing and heating the thermosetting resin in powder form in a mold, or by casting the resin in molten form or in solution into a mold followed by heating. It is of course possible to employ other conventional molding or shaping techniques such as extrusion, compression molding, transfer molding, and injection molding.

When a shaped thermoset article is prepared, it is possible and often preferable to incorporate a filler and/or reinforcing agent in the resin in order to provide the article with various properties, particularly improved mechanical properties. Examples of suitable fillers and/or reinforcing agents include glass fibers, carbon fibers, boron fibers, and other ceramic, carbonaceous, or organic materials in the form of fibers, granules flakes, hollow bodies, or plates. Thus, this invention also provides a molding compound which comprises the above-mentioned aromatic thermosetting resin and at least one fiber and/or reinforcing agent.

Other additives may also be added to the resin as long as they do not adversely affect the properties of the resulting shaped article. For example, a dehydrating agent or water binding agent which is reactive with the water of condensation formed during curing or which adsorbs it may be added to the resin to further improve the cloud-preventing properties of the resin of the present invention.

The condensed polycyclic, polynuclear aromatic thermosetting resin of the present invention is useful in various applications. The resin, when cured in a mold, does not cause clouding on the surface of the mold and can provide thermoset moldings having a smooth surface with a gloss superior to that obtained from a similar conventional aromatic thermosetting resin. It may be used alone in the manufacture of shaped articles or as a matrix resin in the manufacture of composite articles. A thermoset molding of the resin has good heat resistance and mechanical properties. Its long-term service temperature is generally as high as 250°-300° C. and it is less expensive than the polyimide resins, so it can be utilized as relatively inexpensive heat-resisting resin.

The above-described aromatic thermosetting resin with or without a fiber and/or reinforcing agent may be used to manufacture a wide variety of products.

In one embodiment of the invention, there is provided a molding compound for the manufacture of slide parts which comprises the aromatic thermosetting resin and graphite as a solid lubricative filler. Incorporation of graphite in the resin matrix provides the resulting composite molded articles (slide parts) with significantly improved slide properties such as lubricating properties and wear resistance, which are superior to those of the prior art composite plastic slide parts based on various thermosetting resins such as a phenol formaldehyde resin, an epoxy resin, and a polyimide resin.

If the graphite fiber is replaced by other solid lubricative filler such as molybdenum disulfide or polytetrafluoroethylene resin, the slide properties of the resulting molded article will be improved only to a sight extent over an unfilled molded article. It is surprising that a combination of the aromatic thermosetting resin used herein and graphite provides a molding compound from which slide parts having excellent slide properties which are improved over those of even polyimide-based slide parts can be manufactured. Although the reason why this combination has such unique properties is not clear, it is believed that the aromatic thermosetting resin used herein contains a number of benzene rings so that it has a greater compatibility than other resins with graphite which has the structure of $C_6$-rings similar to benzene rings.

Any form of graphite can be used as a filler for the molding compound for slide parts. Preferably graphite fakes or plates are used. Graphite flakes having a carbon content of at least 99.9% by weight are particularly preferred.

The graphite is incorporated in the molding compound in an amount of from about 5% to about 70%, and preferably from about 10% to about 60% by weight based on the total weight of the molding compound. If the amount of graphite is less than about 5%, the slide properties of the molded articles will not be improved adequately. Incorporation of more than 70% graphite will deteriorate the moldability of the molding compound and also lead to the formation of molded articles with poor mechanical properties.

Other additives such as other fillers or reinforcing agents may be added to the molding compound for slide parts as long as they do not adversely affect the properties of the molding compound. One preferred additive is a fibrous reinforcing agent such as carbon fibers or glass fibers, and preferably carbon fibers. Addition of fibrous reinforcing agent provides a molded article having a higher limit of PV value indicating that it can withstand a greater load or a higher slide velocity. For this purpose, a fibrous reinforcing agent may be added to the molding compound usually in an amount of from about 5% to about 50%. and preferably from about 10% to about 40% by weight based on the total weight of the molding compound.

A molding compound for the manufacture of slide parts can be prepared by uniformly blending the aromatic thermosetting resin, the graphite flakes or plates, and optional additives (if any) such as reinforcing fibers in a conventional manner.

For example, the resin in pellet or granule form may be dry-mixed with graphite and an optional additive in a mixer, and the mixture may be kneaded in a roll mill and then chopped into granules, or melt blended in a kneader and then pulverized and granulated. Alternatively the mixture may be melt-blended in an extruder and then extruded into a strand which is then chopped into pellets.

The molding compound thus obtained can be molded to manufacture slide parts by any conventional molding technique such as compression molding, transfer molding, or injection molding. The molding technique may be selected in accordance with the shape of the slide parts to be manufactured.

Prior to molding, the molding compound may be preheated for about 10 to about 30 minutes at about 100° to 120° C. in order to adjust its flow properties or remove volatiles. Precaution should be taken so as to prevent the resin from curing during preheating.

The molded body is then heated at a temperature of from about 100° C. to about 350° C. for a period of about 1 to about 15 hours to cure the resin and form an insoluble and infusible thermoset composite molded article which is useful as a slide part having good heat resistance, mechanical properties and slide properties. The molded body may be heated while it is placed in the mold used in the molding step throughout the entire period of heating. In view of productivity of moldings, however, it is preferred that the molded body be heated for a short period, e.g., a few minutes, in the mold to cure the resin incompletely and that it be then removed from the mold and subjected to post-curing by continuing heating until the resin is completely cured.

The above-described procedures for preparing molding compounds and manufacturing thermoset molded articles may be applied to the cases where molded articles other than slide parts are manufactured.

The following non-limiting examples are given merely for the purpose of illustration. Various modifications may be made by those skilled in the art without departing from the scope of the invention.

In the following examples, the flow temperatures of the resulting resins were measured on a glow tester (Shimadzu Flow Tester CFT-500) at a heating rate of 6° C./min to determine the temperature at which the apparent viscosity of the sample fell to $1 \times 10^5$ poise. This temperature was recorded as the flow temperature.

The insolubilized acid ratio of each resin was measured in the following manner. A sample of the resin (1 g) was dissolved in 50 g of tetrahydrofuran and the resulting solution was titrated with a 0.1N aqueous sodium hydroxide solution to determine the total acid content of the resin, which was recorded as the acid content before extraction of water-soluble acid. Separately, another sample of the resin (1 g) was dissolved in 3 g of tetrahydrofuran and 10 g of water was added to the resulting solution and thoroughly mixed to precipitate the resin and extract any water-soluble acid into water. After the precipitated resin was collected by filtration, dried in vacuo, and weighed, the acid content of the collected resin after extraction was determined by titration under the same conditions as used in the titration before extraction, and it was recorded as the acid content after extraction of water-soluble acid. The insolubilized acid ratio is the percentage calculated by dividing the acid content after extraction by the acid content before extraction.

EXAMPLE 1

A glass reactor equipped with a thermometer, a mechanical stirrer, and a nitrogen inlet was charged with 64.0 g (0.5 moles) of naphthalene as a starting material, 110.4 g (0.8 moles) of 1,4-dihydroxymethylbenzene as a crosslinking agent, and 10.4 g (0.046 moles) of 2-naphthalenesulfonic acid monohydrate as an acid catalyst. The mixture was reacted with stirring in a nitrogen stream at 110° C. for 120 minutes to give a thermosetting resin having the properties shown in Table 1.

TABLE 1

| Flow temperature | 83° C. |
|---|---|
| Insolubilized acid ratio | 88% |

The resulting thermosetting resin which was crushed was placed in a mold measuring 30 mm × 50 mm × 2 mm and having chrome-plated inner walls and cured at 200° C. under a pressure of 300 kg/cm² for 2 minutes. The resulting thermoset molding had a smooth surface with excellent gloss. No clouding was visually observed on the surface of the mold.

COMPARATIVE EXAMPLE 1

The same reactor as used in Example 1 was charged with 64.0 g (0.5 moles) of naphthalene as a starting material, 110.4 g (0.8 moles) of 1,4-dihydroxymethylbenzene as a crosinking agent, and 8.72 g (0.046 moles) of p-toluenesulfonic acid monohydrate as an acid catalyst, and the mixture was reacted with stirring in a nitrogen stream at 120° C. for 120 minutes to give a thermosetting resin having the properties shown in Table 2.

TABLE 2

| Flow temperature | 104° C. |
|---|---|
| Insolubilized acid ratio | 7% |

A thermoset molding was prepared by molding and curing the resulting resin under the same conditions as in Example 1. It had a rough surface with no gloss. Upon visual inspection of the mold, white powdery deposits were observed throughout the inner surface of the mold.

COMPARATIVE EXAMPLE 2

The same reactor as used in Example 1 was charged with 64.0 g (0.5moles) of naphthalene as a starting material, 110.4 g (0.8 moles) of 1,4-dihydroxymethylbenzene as a crosslinking agent, and 10.18 g (0.047 moles) of m-xylenesulfonic acid dihydrate as an acid catalyst. The mixture was reacted with stirring in a nitrogen stream at 120° C. for 75 minutes to give a thermosetting resin having the properties shown in Table 3.

TABLE 3

| Flow temperature | 92° C. |
|---|---|
| Insolubilized acid ratio | 40% |

A thermoset molding was prepared by molding and curing the resulting resin under the same conditions as in Example 1. It had a relatively rough surface with substantially no gloss. Upon visual inspection of the mold, white powdery deposits were observed throughout the inner surface of the mold, but the amount of the deposits was much less than that observed in Comparative Example 1.

EXAMPLE 2

Following the procedure described in Example 1, 72.0 g (0.5 moles) of β-naphthol as a starting material, 110.4 g (0.8 moles) of 1,4-dihydroxymethylbenzene as a crosinking agent, and 2.24 g (0.009 moles) of p-phenolsulfonic acid dihydrate as an acid catalyst were reacted with stirring in a nitrogen stream at 110° C. for 100 minutes to give a thermosetting resin having the properties shown in Table 4.

TABLE 4

| Flow temperature | 80° C. |
|---|---|
| Insolubilized acid ratio | 68% |

A thermoset molding was prepared by molding and curing the resulting resin under the same conditions as in example 1.

It had a smooth surface with good gloss. No clouding was visually observed on the inner surface of the mold.

EXAMPLE 3

Following the procedure described in Example 1, 64.0 g (0.5 moles) of naphthalene as a starting material. 110.4 g (0.8 moles) of 1,4-dihydroxymethylbenzene as a crosslinking agent, and 8.72 g of polystyrenesulfonic acid resin (acid content: 4.7 meq/g) as an acid catalyst were reacted with stirring in a nitrogen stream at 130° C. for 100 minutes to give a thermosetting resin having a flow temperature of 106° C.

A thermoset molding measuring 30 mm × 50 mm × 2 mm was prepared by placing the resin in the same mold as used in Example 1 followed by curing at 200° C. and 300 kg/cm² for 3 minutes. The resulting molding had a smooth surface with excellent gloss, while no clouding was visually observed on the inner surface of the mold.

EXAMPLE 4

A sulfonated product of a condensed polycyclic polynuclear aromatic resin which is useful as a water-insoluble catalyst in the present invention was prepared in the following manner.

The same reactor as used in Example 1 was charged with 64.0 g (0.5 moles) of naphthalene as a starting material, 51.8 g (0.375 moles) of 1,4-dihydroxymethylbenzene as a crosslinking agent, and 5.8 g (0.031 moles) of p-toluenesulfonic acid monohydrate as an acid catalyst. The mixture was heated to 150° C. with stirring in a nitrogen stream and reacted for 60 minutes to give a condensed polycyclic polynuclear aromatic resin. The resulting resin was pulverized and added to concentrated sulfuric acid in an amount 8 times the weight of the resin. The mixture was heated under stirring at 140° C. for 180 minutes to sulfonate the resin. The sulfonated resin was recovered, washed with water to remove the remaining sulfuric acid and p-toluenesulfonic acid, and dried to yield a sulfonated product of the condensed polycyclic polynuclear aromatic resin having an acid content of 3.3 meq/g. This sulfonated aromatic resin was subsequently used as a water-insoluble acid catalyst in the preparation of a thermosetting aromatic resin as follows.

The same reactor as used in Example 1 was charged with 64.0 g (0.8 moles) of naphthalene as a starting material, 110.4 g (0.8 moles) of 1,4-dihydroxymethylbenzene as a crosslinking agent, and 12.4 g of the above sulfonated aromatic resin as an acid catalyst, and the mixture was reacted with stirring in a nitrogen stream at 130° C. for 90 minutes to give a thermosetting resin having a flow temperature of 98° C.

A thermoset molding was prepared by molding and curing the resulting resin under the same conditions as in example 3. It had a smooth surface with good gloss, and no clouding was visually observed on the inner surface of the mold.

EXAMPLES 5 AND 6

The aromatic thermosetting resin prepared in Example 1 which had been crushed was blended with graphite or with graphite plus carbon fibers in the proportions (parts by weight) shown in Table 5 below to form a molding compound for the manufacture of slide parts. The graphite was in the form of graphite fakes containing more than 99.9% by weight carbon, and the carbon fibers were PAN-based fibers having an average fiber length of 6 mm. The materials in each formulation were dry-mixed in a mixer and then melt-blended in a roll mill at a temperature of 100° C. while the front roll and the back roll of the mill were rotated at 20 rpm and 24 rpm, respectively. The blend was then chopped into granules in a cutter mil to give a molding compound.

The molding compound was then subjected to compression molding at a mold temperature of 180° C. under a molding pressure of 300 kg/cm² for 2 minutes to form a disk measuring 50 mm (diameter)×3 mm (thickness). Each disk had smooth surfaces and a good surface gloss. No clouding was observed on the inner surface of the mold, and it could be used repeatedly in continuous molding operation.

The molded disks were heated at 250° C. for 12 hours to effect post-curing of the disks. The resulting cured disks were then used to determine the following properties:

(1) Limit of PV Value (kgf/cm²·cm/sec)

The disk was tested in accordance with the procedure specified in JIS K 7218 for Testing Methods for Sliding Wear Resistance of plastics using a mating member of S45C to be rotatively contacted with the test disk. The test was performed at a slide velocity of 60 cm/sec while the applied load was gradually increased. The limit of PV value was the product of P (load) and V (slide velocity) measured at the critical point at which the friction sharply increased due to seizing.

(2) Coefficient of Friction (μ) and Abrasion Loss (mg/1,000 m-slide distance)

Following the procedure specified in JIS K 7218 for Testing Methods for Sliding Wear resistance of Plastics in which a Suzuki-type frictional abrasion tester was used, the test disk was continuously subjected to abrasive wear against a rotating mating member of S45C at a slide velocity (V) of 60 cm/sec in an atmosphere of room temperature under a load (P) of 4.5 kgf. The test was continued until the slide distance reached 3,000 m, while the frictional force (F) exerted on the test disk was measured at intervals of 10 minutes. After the abrasion test was completed, the weight loss of the test disk was determined as the total abrasion loss. Based on each measurement of the frictional force, the coefficient of friction was calculated by the following equation:

Coefficient of Friction (μ)=F/P.

The calculated values obtained were average value was recorded as the coefficient of friction of the test disk. The abrasion loss was expressed as the average for each 1,000 meter slide distance. The test results are also included in Table 5.

TABLE 5

|  | Example 5 | Example 6 |
|---|---|---|
| Composition of molding compound* | | |
| Aromatic thermosetting resin | 60 | 60 |
| Graphite flakes | 20 | 40 |
| Carbon fibers | 20 | — |
| Properties of molded article | | |
| Limit of PV value | 7,500 | 6,000 |
| Coefficient of friction | 0.21 | 0.19 |
| Abrasion loss | 0.5 | 0.4 |

*The compositions are indicated in parts by weight.

COMPARATIVE EXAMPLES 3-5

Following the procedure of Example 6, molding compounds were prepared and then compression-molded into disks except that the aromatic thermosetting resin prepared in Example 1 was blended with different lubricating fillers as shown in Table 6. The properties of the resulting disks were determined in the same manner as in Examples 5 and 6 and the results are also included in Table 6.

TABLE 6

|  | Comparative Example No. | | |
|---|---|---|---|
|  | 3 | 4 | 5 |
| Composition of molding compd.* | | | |
| Aromatic thermosetting resin | 60 | 60 | 100 |
| Polytetrafluoroethylene resin | 40 | — | — |
| Molybdenum disulfide | — | 40 | — |
| Properties of molded article | | | |
| Limit of PV value | 5,000 | 5,500 | 5,000 |
| Coefficient of friction | 0.32 | 0.37 | 0.51 |
| Abrasion loss | 1.1 | 1.0 | 1.0 |
| Clouding on mold | None | None | None |

*The compositions are indicated in parts by weight.

As is apparent from a comparison of Tables 5 and 6, the present molding compounds in which graphite was blended with the aromatic thermosetting resin have molded articles having significantly improved slide properties, i.e., higher PV values and much smaller coefficients of friction and abrasion losses.

COMPARATIVE EXAMPLES 6 AND 7

Following the procedure of Examples 5 and 6, molding compounds were prepared and then compression-molded into disks except that the aromatic thermosetting resin prepared in Comparative Example 1 was used as the resin and blended with graphite or with graphite plus carbon fibers. Each of the resulting composite molded articles had rough surfaces and poor surface gloss. White powdery deposits were observed on the inner surface of the mold and the mold could not be used repeatedly unless it was cleaned.

What is claimed is:

1. A condensed polycyclic, polynuclear aromatic thermosetting hydrocarbon resin which is prevented from forming a cloud on a mold during molding, said resin being a prepolymer derived by condensation polymerization of a starting material with a crosslinking agent in the presence of an acid catalyst, wherein the starting material is selected from the group consisting of condensed polycyclic aromatic hydrocarbon compounds and mixtures of a condensed polycyclic aromatic hydrocarbon compound with a monocyclic aromatic hydrocarbon compound, the crosslinking agent is an aromatic compound having at least two hydroxymethyl groups attached to the aromatic ring, and the resin has a flow temperature of not higher than 150° C., and wherein the acid catalyst is water-insoluble or when it is water-soluble, the resin has an insolubilized acid ratio of at least 50%.

2. In a method for preparing a condensed polycyclic, polynuclear aromatic thermosetting resin by condensation polymerization of a starting material with a crosslinking agent in the presence of an acid catalyst, said starting material being selected from the group consisting of condensed polycyclic aromatic compounds and mixtures of a condensed polycyclic aromatic compound with a monocyclic aromatic compound, and said crosslinking agent being an aromatic compound having at least two hydroxymethyl groups, the improvement wherein the acid catalyst is a water-soluble acid which is reactive with either one of the starting material or the crosslinking agent or both and wherein the resulting thermosetting resin has an insolubilized acid ratio of at least 50% and a flow temperature of not higher than 150° C., said resin being prevented from forming a cloud on a mold during molding.

3. The method of claim 2 wherein the acid catalyst is an organic sulfonic acid which is reactive with the hydroxymethyl groups of the crosslinking agent.

4. The method of claim 3 wherein the organic sulfonic acid is of the polycyclic aromatic or phenolic structure.

5. The method of claim 2 wherein the acid catalyst is an organic sulfonic acid which has at least one functional group selected from hydroxymethyl and formyl groups.

6. In a method for preparing a condensed polycyclic, polynuclear aromatic thermosetting resin by condensation polymerization of a starting material with a crosslinking agent in the presence of an acid catalyst, said starting material being selected from the group consisting of condensed polycyclic aromatic compounds and mixtures of a condensed polycyclic aromatic compound with a monocyclic aromatic compound. And said crosslinking agent being an aromatic compound having at least two hydroxymethyl groups, the improvement wherein the acid catalyst is a water-insoluble acid and wherein the resulting thermosetting resin has a flow temperature of not higher than 150° C., said resin being prevented from forming a cloud on a mold during molding.

7. The method of claim 6 wherein the water-insoluble acid catalyst is a water insoluble-resin containing sulfonic acid functional groups or an organic sulfonic acid having at least one hydrophobic group.

8. A molding compound comprising an aromatic thermosetting resin of claim 1 and at least one filler and/or reinforcing agent.

9. A molding compound for the manufacture of slide parts which comprises an aromatic thermosetting resin of claim 1 and from 5% to 70% by weight of graphite filler, said percent being based on the total weight of the molding compound.

10. A molding compound of claim 9 which further contains at least one fibrous reinforcing agent in an amount of from 5% to 50% by weight based on the total weight of the molding compound.

11. The condensed polycyclic, polynuclear aromatic thermosetting hydrocarbon resin of claim 1 wherein the condensed polycyclic aromatic hydrocarbon or monocyclic aromatic hydrocarbon compound has at least one substituent selected from alkyl and hydroxyl groups.

* * * * *